(12) United States Patent
Chen

(10) Patent No.: US 10,322,740 B2
(45) Date of Patent: Jun. 18, 2019

(54) STROLLER

(71) Applicant: Wonderland Switzerland AG, Steinhausen (CH)

(72) Inventor: Shun-Min Chen, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/669,973

(22) Filed: Aug. 7, 2017

(65) Prior Publication Data

US 2018/0134306 A1  May 17, 2018

(30) Foreign Application Priority Data

Nov. 17, 2016 (CN) .......................... 2016 1 1027437

(51) Int. Cl.
*B62B 7/10* (2006.01)
*B62B 7/14* (2006.01)
*B62B 7/06* (2006.01)

(52) U.S. Cl.
CPC ................ *B62B 7/10* (2013.01); *B62B 7/068* (2013.01); *B62B 7/14* (2013.01); *B62B 7/062* (2013.01); *B62B 7/064* (2013.01); *B62B 2205/20* (2013.01)

(58) Field of Classification Search
CPC ........................................................ B62B 7/10
See application file for complete search history.

(56) References Cited

U.S. PATENT DOCUMENTS

| | | | | |
|---|---|---|---|---|
| 2008/0073877 | A1* | 3/2008 | Pike ......................... | B62B 7/10 280/639 |
| 2012/0242062 | A1* | 9/2012 | Schroeder ................ | B62B 7/08 280/650 |
| 2015/0042075 | A1* | 2/2015 | Smith ..................... | B62B 7/062 280/650 |
| 2015/0274188 | A1* | 10/2015 | Li ........................... | B62B 7/064 280/650 |
| 2017/0174244 | A1* | 6/2017 | Sack ...................... | B62B 7/062 |

* cited by examiner

*Primary Examiner* — James A Shriver, II
*Assistant Examiner* — James J Triggs
(74) *Attorney, Agent, or Firm* — Winston Hsu

(57) ABSTRACT

A stroller includes a stroller frame, a frame locking mechanism, and a seat. The stroller frame can be folded or unfolded. The frame locking mechanism locks the stroller frame to be unfolded. The seat is pivotally connected to the stroller frame and is connected to the frame locking mechanism. Therein, when the seat pivots, the seat drives the frame locking mechanism to unlock the stroller frame so as to fold the stroller frame. The stroller is structurally simple and is convenient to be folded.

11 Claims, 12 Drawing Sheets

STROLLER

BACKGROUND OF THE INVENTION

1. Field of the Invention

The invention relates to a stroller, and especially relates to a foldable stroller.

2. Description of the Prior Art

Nowadays, with the improvement of the people's living standard, strollers have entered into ordinary families. Current strollers are basically foldable. The stroller frame of the strollers is usually provided in form of a linkage assembly of pin-jointed bars. The linkage assembly is provided with a controlling mechanism disposed thereon for controlling the linkage assembly to be unfolded and form a child sitting space or to be folded. Because the stroller uses so many linkage bars, the stroller is structurally complicated and needs structural constraints on many portions of the linkage assembly, which leads to poor safety. Furthermore, when folding the linkage assembly, a user needs to release the structural constraints at the same time, which makes the folding complicated and also makes the linkage assembly difficult to be smoothly folded. Users are usually not satisfied with practical use experiences. Therefore, it is required to improve the stroller frame of the current strollers further.

Therefore, there is a need of a stroller of simple structure and convenience of folding manipulation for overcoming the above shortcomings in the prior art.

SUMMARY OF THE INVENTION

An objective of the invention is to provide a stroller which is structurally simple and is convenient to be folded.

A stroller according to the invention includes a stroller frame, a frame locking mechanism, and a seat. The stroller frame can be folded or unfolded. The frame locking mechanism locks the stroller frame to be unfolded. The seat is pivotally connected to the stroller frame and is connected to the frame locking mechanism. Therein, when the seat pivots, the seat drives the frame locking mechanism to unlock the stroller frame so as to fold the stroller frame.

Preferably, the stroller frame includes a handle, two front legs, and two rear legs corresponding to the two front legs. Each rear leg includes a transverse portion and an extension portion. An end of the transverse portion and a lower end of the handle are pivotally connected at a first pivotal connection point. Another end of the transverse portion and an upper end of the corresponding front leg are pivotally connected at a second pivotal connection point. A rear wheel is installed to a lower end of the extension portion.

Preferably, a transverse bar connects the two lower ends of the two rear legs. Two connecting parts are disposed where the transverse bar is connected to the rear legs. The two rear wheels are installed to the two connecting parts.

Preferably, the handle and the front legs pivot toward the extension portions to be folded. The folded stroller frame can stand by being supported by the handle and the rear wheels.

Preferably, the frame locking mechanism includes a sliding sleeve. The sliding sleeve is slidable along a lengthwise direction of the rear leg. The stroller frame further includes a linkage bar and a basket tube. An upper end of the linkage bar and the handle are pivotally connected at a third pivotal connection point. A lower end of the linkage bar and the sliding sleeve are pivotally connected at a fourth pivotal connection point. A front end of the basket tube and the front leg are pivotally connected at a fifth pivotal connection point. A middle portion of the basket tube and the sliding sleeve are pivotally connected at the fourth pivotal connection point.

Preferably, the second pivotal connection point and the fifth pivotal connection point are axially symmetrical to the first pivotal connection point and the third pivotal connection point relative to the extension portion respectively.

Preferably, the frame locking mechanism includes a sliding sleeve and an engaging assembly. The sliding sleeve is slidable along a lengthwise direction of the rear leg and has a positioning hole. The engaging assembly is connected to the rear leg and includes a positioning pin. The positioning pin is engaged into the positioning hole so as to fix the sliding sleeve to the rear leg.

Preferably, the engaging assembly further includes a mount, a first driving part, a first elastic part, and a linking part. The rear leg is tubular. The mount is disposed inside the rear leg and is fixedly connected to the rear leg. The mount has a sliding slot along an engagement direction of the positioning pin. The first driving part has a driving slanting slot; an angle is formed by the driving slanting slot and the sliding slot. The positioning pin passes through the sliding slot and the driving slanting slot simultaneously. The linking part is connected to the first driving part. When the linking part is manipulated along the lengthwise direction of rear leg, the positioning pin is driven to depart from the positioning hole along the sliding slot. The first elastic part is disposed between the first driving part and the mount. When the manipulating of the linking part is stopped, the first elastic part drives the first driving part to return and keeps the positioning pin in engaging with the positioning hole.

Preferably, a front end of the seat is pivotally connected to the front leg. A rear end of the seat is engaged with the rear leg through a seat engaging mechanism. The frame locking mechanism includes a linking part connected to the seat. After the seat engaging mechanism disengages the rear end of the seat from the rear leg, the seat is able to pivot relative to the front leg so as to drive the linking part to make the frame locking mechanism unlock the stroller frame.

Preferably, the seat engaging mechanism is disposed on the seat and includes an engaging pin, a second driving part, a manipulation part, and a second elastic part. The rear leg has an engaging hole. The seat has a through hole. The engaging pin passes through the through hole and selectively engages with or disengages from the engaging hole. The second driving part is fixedly connected to the engaging pin and has a first slanting surface. The manipulation part has a second slanting surface. The second slanting surface contacts the first slanting surface and is slidable relative to the first slanting surface. A slanting direction of the first slanting surface and the second slanting surface and a movement direction of the engaging pin form an angle. The second elastic part is disposed between the second driving part and the seat for driving the engaging pin to engage with the engaging hole.

Preferably, the handle includes a handle upper portion and two handle lower portions pivotally connected to the rear legs. The handle upper portion is slidably connected to the two handle lower portions. The handle upper portion slides relative to the two handle lower portions so as to adjust a height of the handle.

Preferably, the handle upper portion is fixed to the handle lower portion by a fixing mechanism disposed therebetween. The fixing mechanism includes an unlocking manipulation part. The unlocking manipulation part is disposed at a middle location of the handle upper portion.

Compared with the prior art, the invention provide a new foldable stroller which includes a stroller frame, a frame locking mechanism, and a seat. By making the seat pivot, the seat drives the frame locking mechanism to unlock the stroller frame so as to fold the stroller frame. It is practicable to use one hand to manipulate the seat for completing the folding of the stroller frame. Therefore, the structure of the stroller frame is simple, and the folding can be performed conveniently, quickly, and smoothly.

These and other objectives of the present invention will no doubt become obvious to those of ordinary skill in the art after reading the following detailed description of the preferred embodiment that is illustrated in the various figures and drawings.

DETAILED DESCRIPTION

A stroller 1 of an embodiment is provided according to the invention. The stroller 1 is structurally simple and convenient to be folded.

Figure 1:
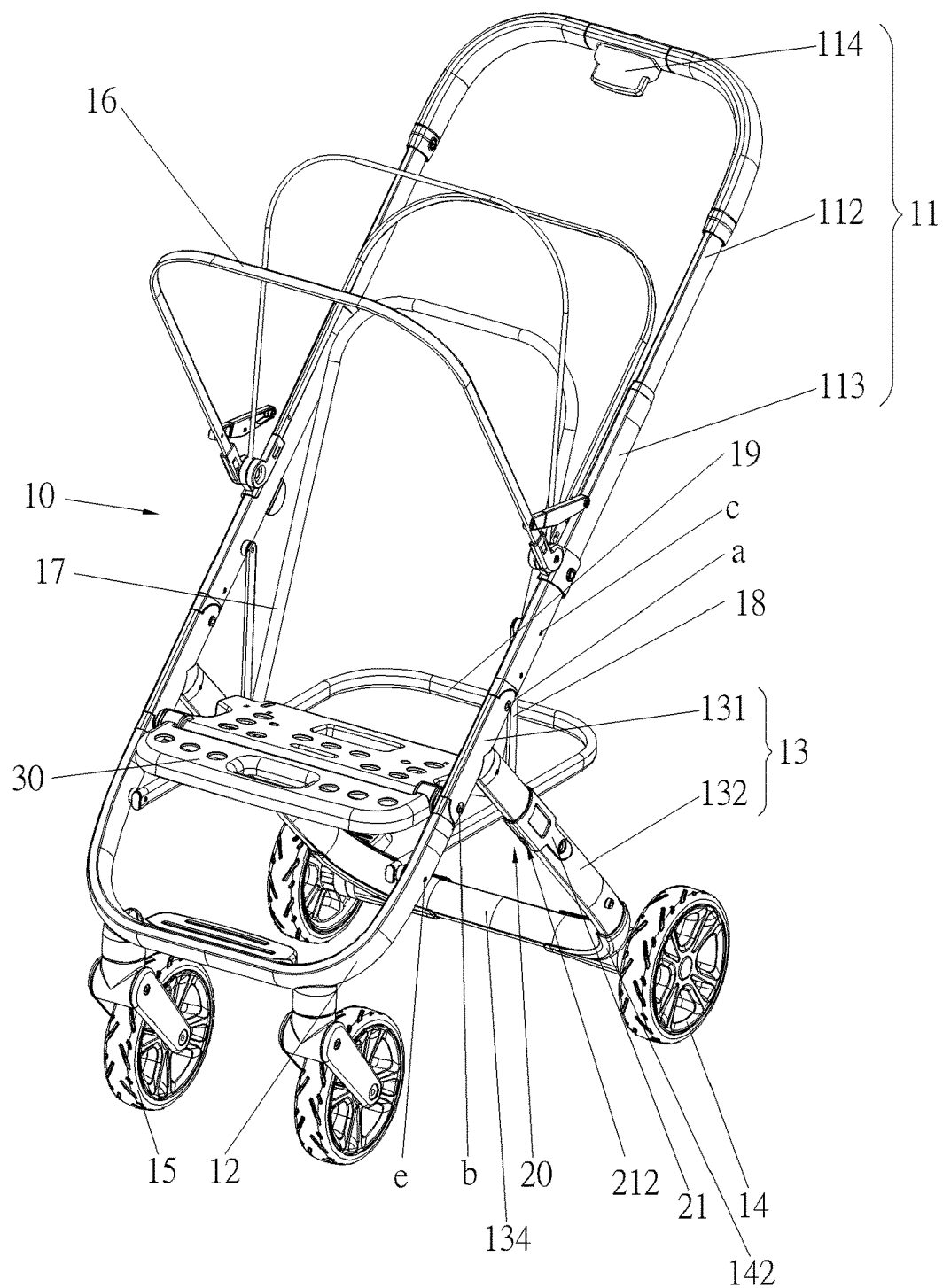
FIG. 1 is a schematic diagram illustrating a stroller of an embodiment according to the invention from a viewpoint at a front side of the stroller.
Figure 2:
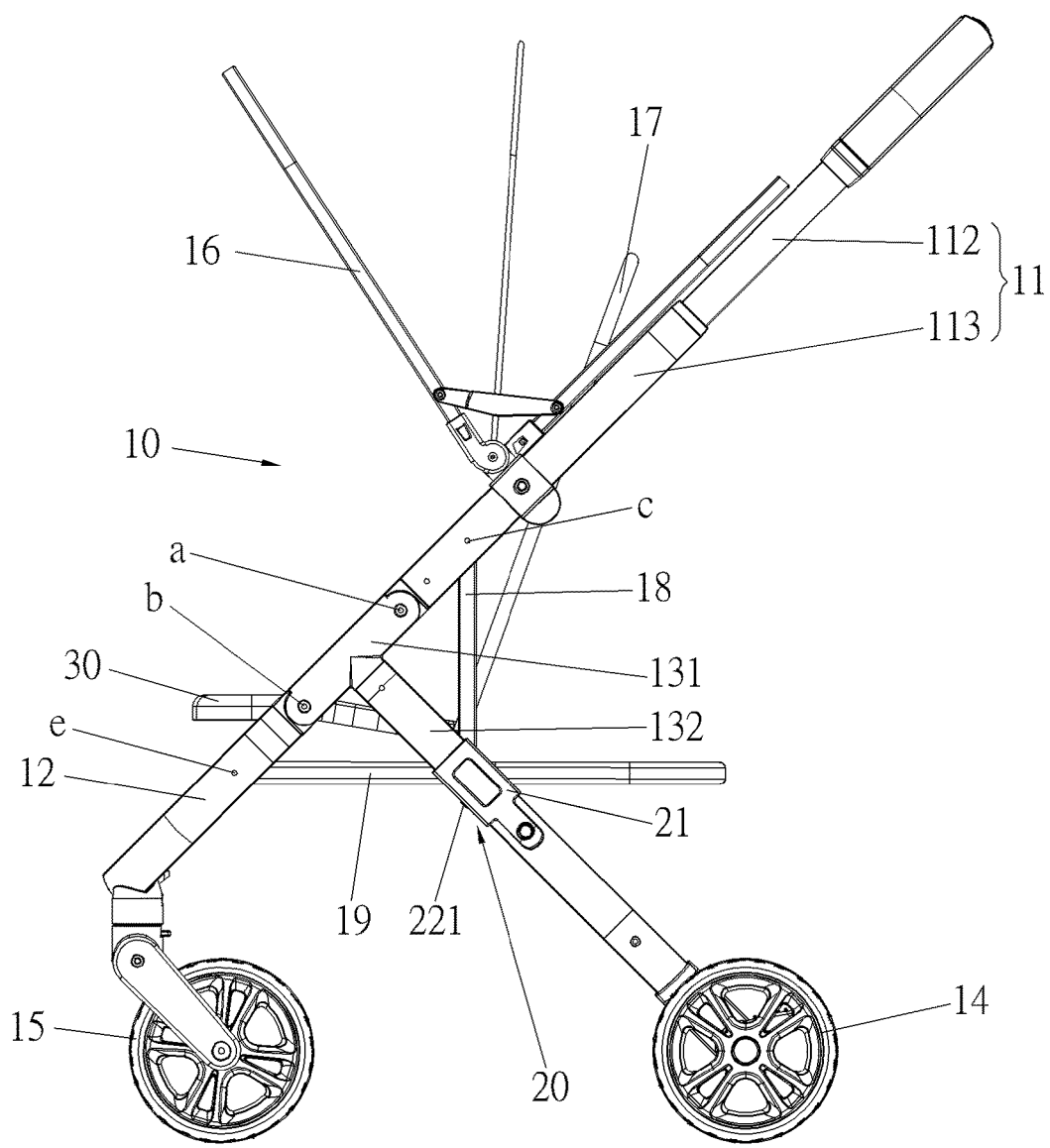
FIG. 2 is a side view of the stroller in FIG. 1.
Figure 3:
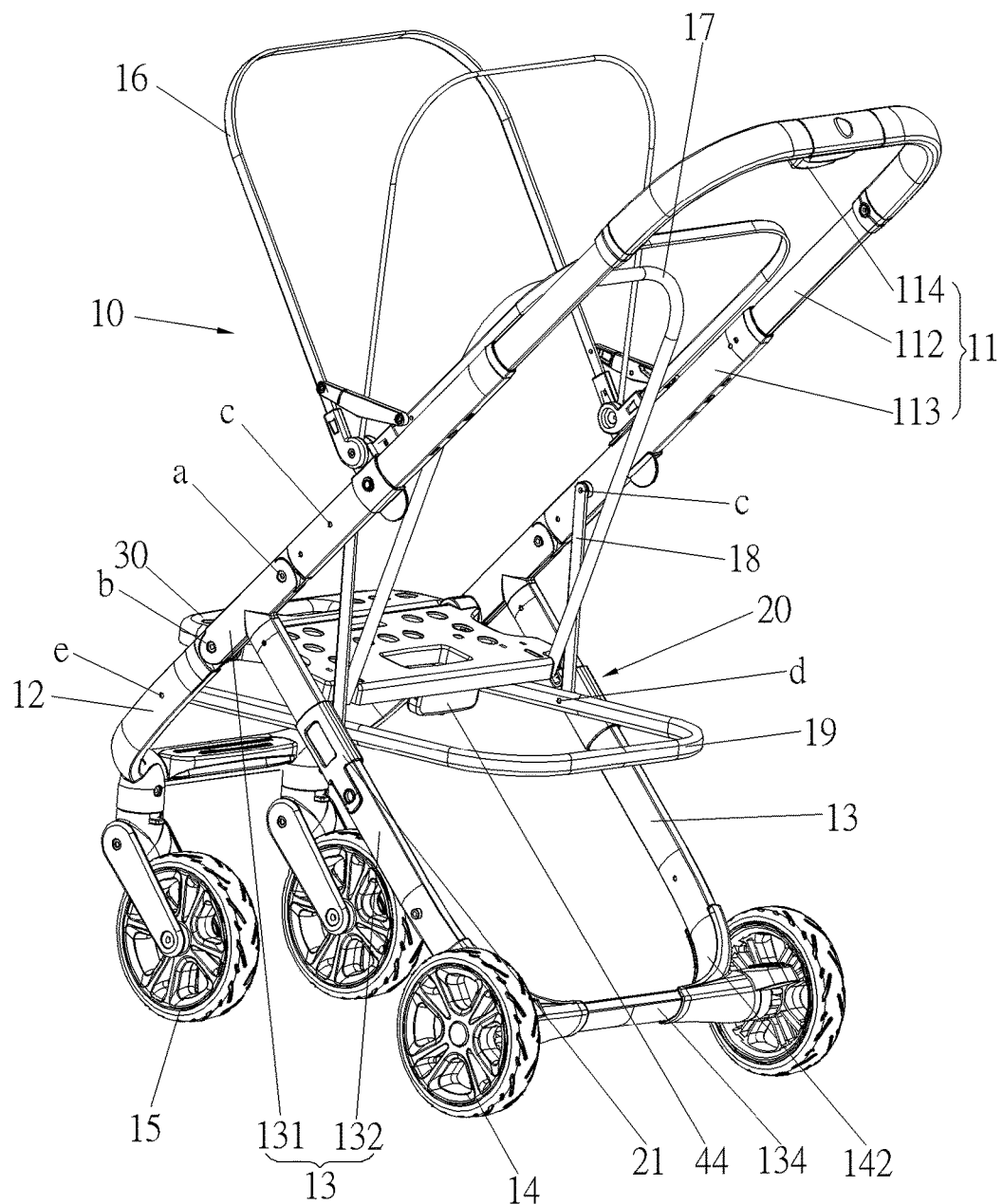
FIG. 3 is a schematic diagram illustrating the stroller in FIG. 1 from a viewpoint at a back side of the stroller.
Figure 4:
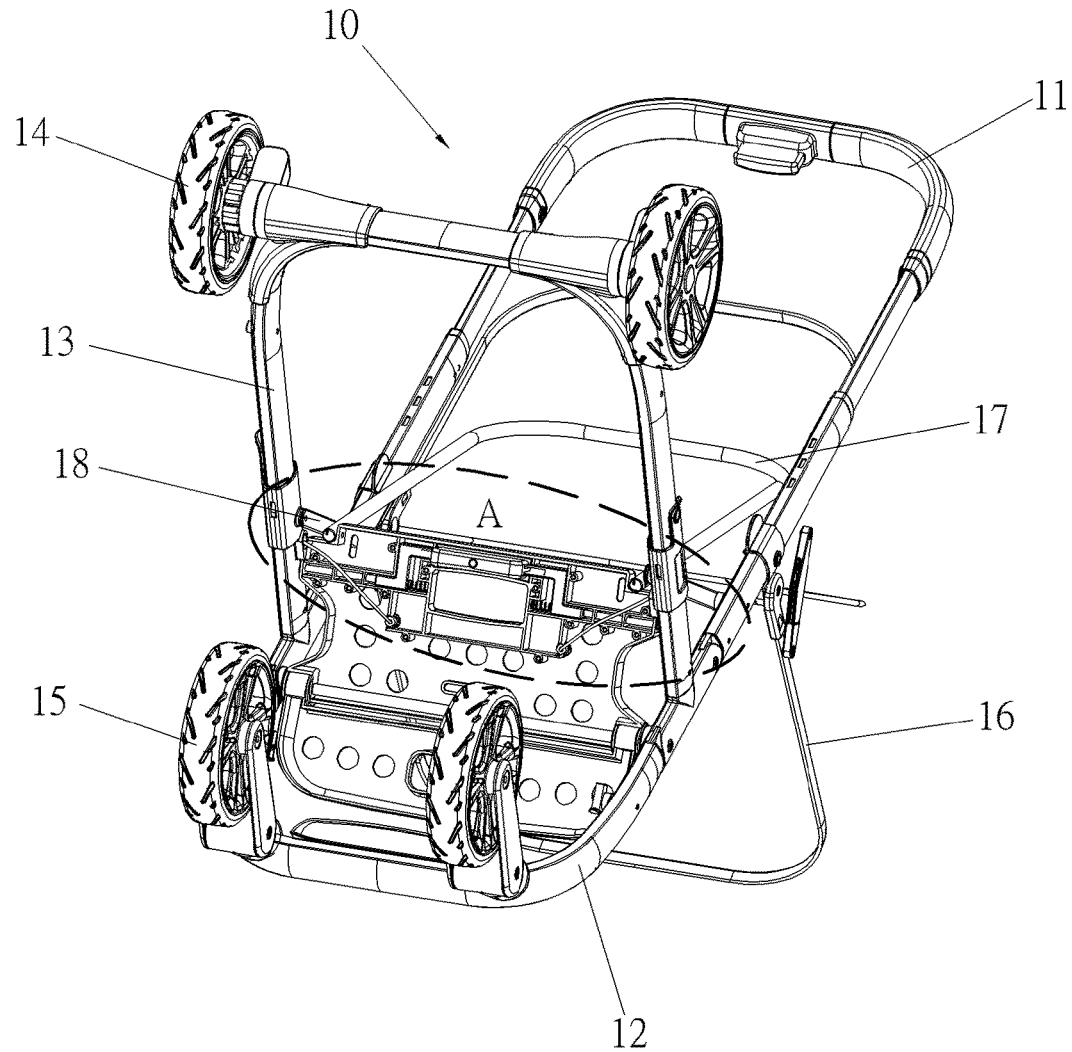
FIG. 4 is a schematic diagram illustrating the stroller in FIG. 1 from a viewpoint at a bottom side of the stroller for showing a seat engaging mechanism of the stroller at an engagement state.
Figure 5:
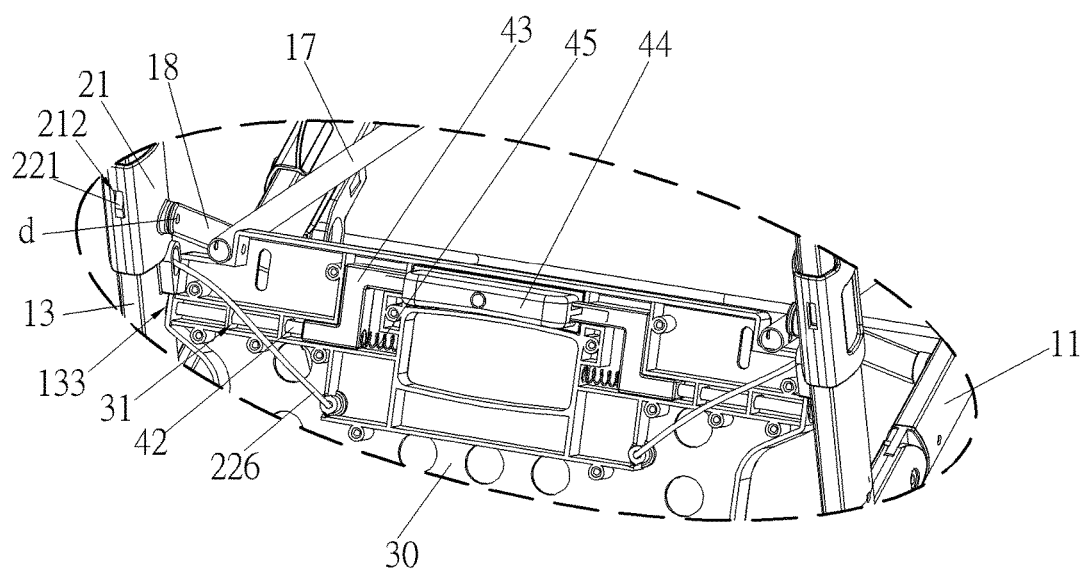
FIG. 5 is an enlarged view of the portion A in FIG. 4.
Figure 6:
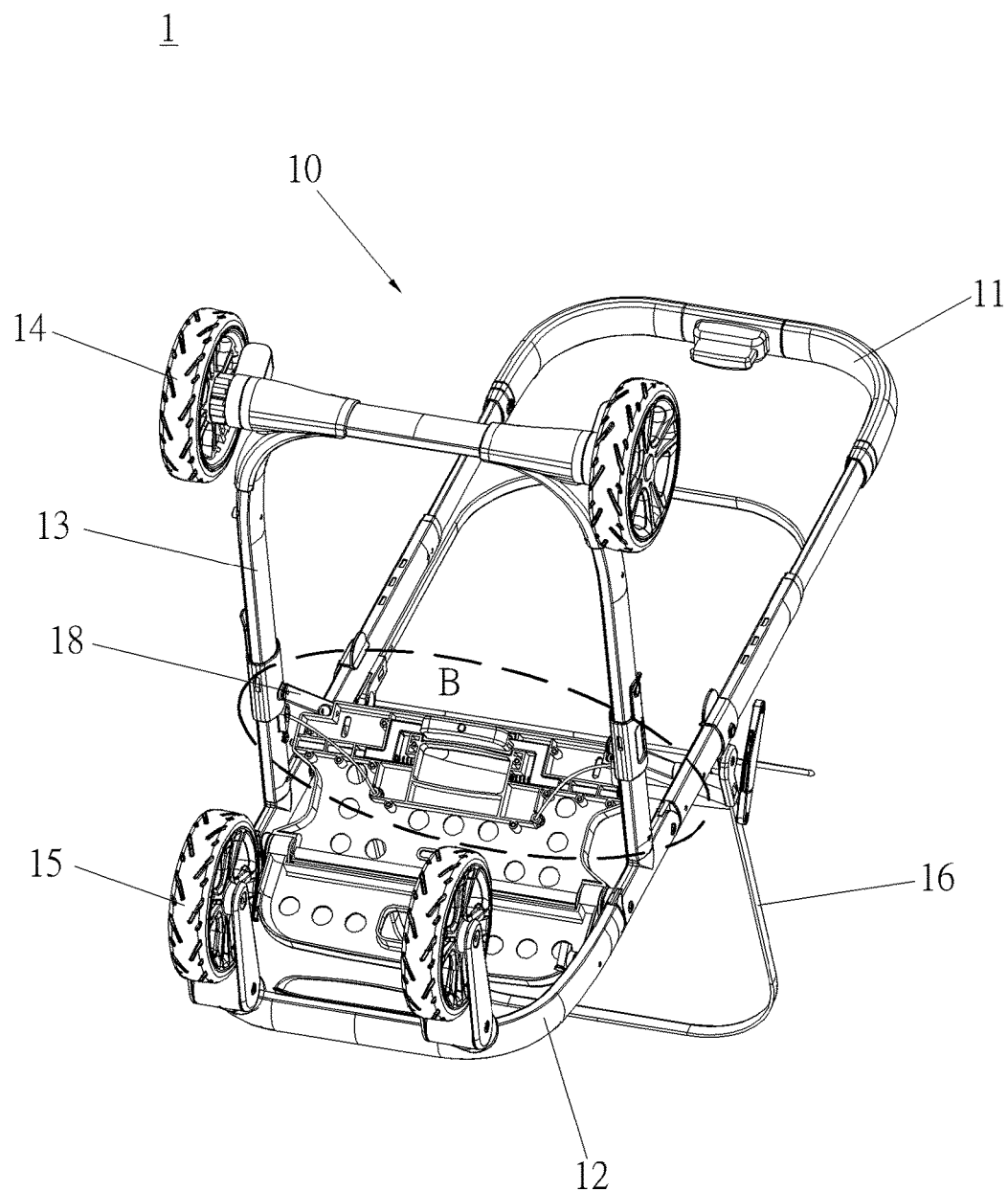
FIG. 6 is another schematic diagram illustrating the stroller in FIG. 1 from the viewpoint at the bottom side of the stroller for showing the seat engaging mechanism at a disengagement state.
Figure 7:
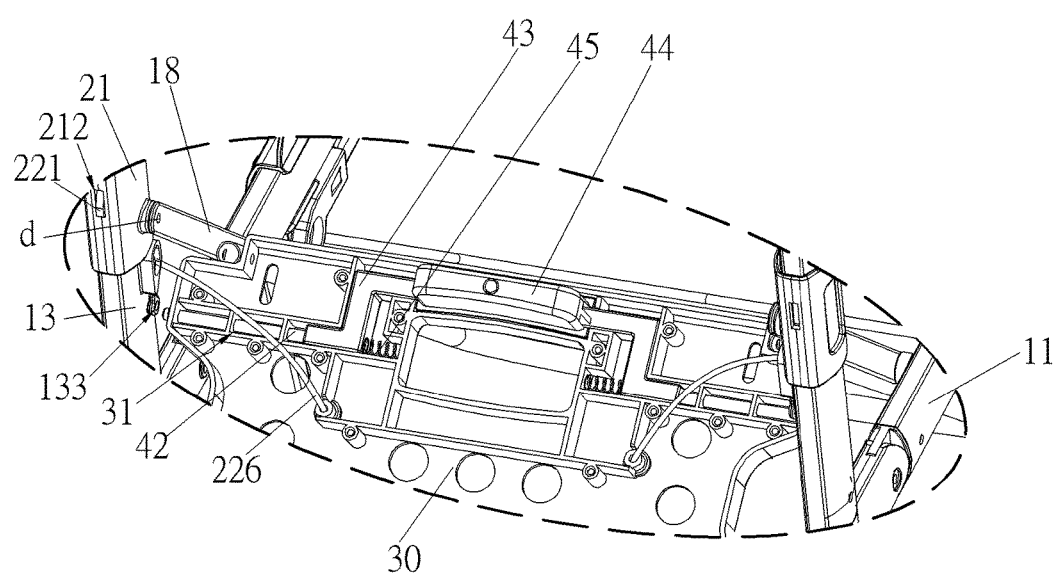
FIG. 7 is an enlarged view of the portion B in FIG. 6.
Figure 8:
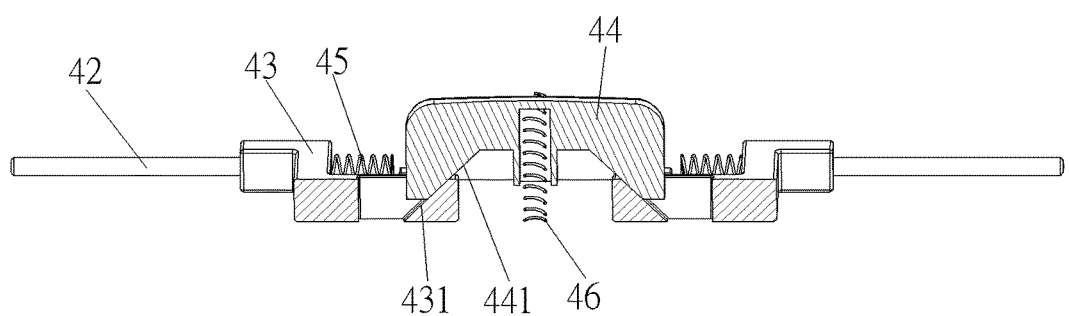
FIG. 8 is a schematic diagram illustrating the seat engaging mechanism of the stroller.
Figure 11:
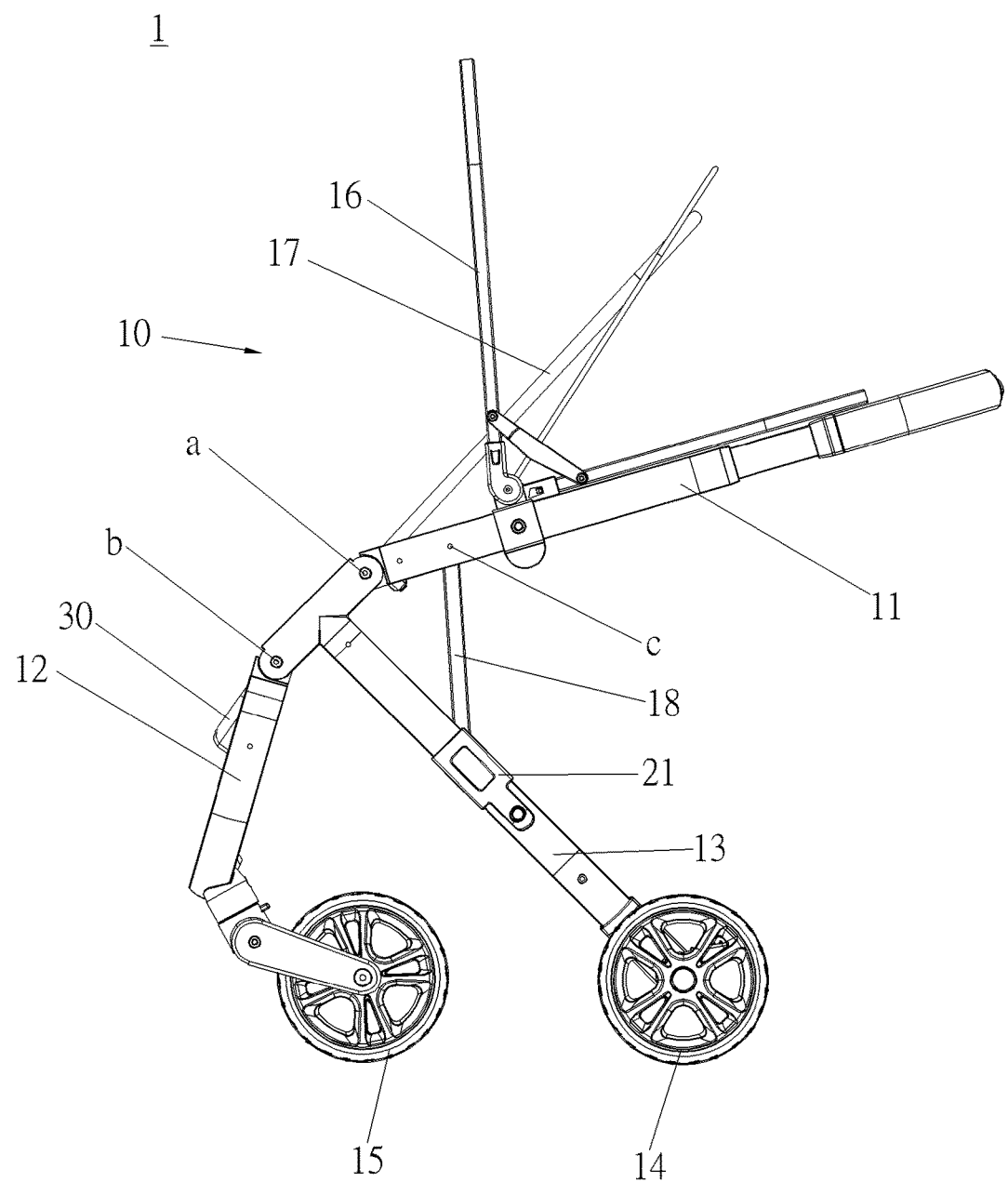
FIG. 11 is a schematic diagram illustrating the stroller which is partially folded.

As shown by FIG. 1 to FIG. 3, the stroller 1 includes a stroller frame 10, a frame locking mechanism 20, and a seat 30. The stroller frame 10 can be unfolded or folded (as shown by FIG. 11). The frame locking mechanism 20 locks the stroller frame 10 to be at an unfolded state. The seat 30 is pivotally connect to the stroller frame 10 and is connected to the frame locking mechanism 20. Rotating the seat 30 can drive the frame locking mechanism 20 to unlock the stroller frame, and then the stroller frame can be folded. In practice, the stroller frame 10 includes a handle 11, two front legs 12, and two rear legs 13 corresponding to the two front legs 12. The rear leg 13 is provided in a T-shaped form and includes a transverse portion 131 and an extension portion 132. An end of the transverse portion 131 and a lower end of the handle 11 are pivotally connected at a first pivotal connection point a; another end of the transverse portion 131 and an upper end of the corresponding front leg 12 are pivotally connected at a second pivotal connection point b. A rear wheel 14 is installed to a lower end of the extension portion 132. A front wheel 15 is installed to a lower end of the front leg 12. Preferably, the two lower ends of the extension portions 132 are connected by a transverse bar 134 to form a U-shaped structure. Two connecting parts 142 are disposed at two bent portions respectively where the two extension portions 132 and the transverse bar 134 are connected. The two rear wheels 14 are connected to the connecting parts 142.

The handle 11 includes a handle upper portion 112, provided in a reverse U-shaped form, and two handle lower portions 113, pivotally connected to the two rear legs 13. The handle upper portion 112 is slidably connected to the handle lower portion 113. A height of the handle 11 can be adjusted by sliding the handle upper portion 112 relative to the two handle lower portions 113. A fixing mechanism (not shown in the figures) is disposed between the handle upper portion 112 and the handle lower portion 113, for fixing the handle upper portion 112 to the two handle lower portions 113. The fixing mechanism has an unlocking manipulation part 114. The unlocking manipulation part 114 is disposed at a middle location of the handle upper portion 112. Because the fixing mechanism is a common means in the prior art, it will not be described in addition.

The stroller frame 10 further includes a canopy 16 and a backrest 17. The canopy 16 is pivotally connected to the handle 11. The backrest 17 is pivotally connected to a rear end of the seat 30.

Figure 12:
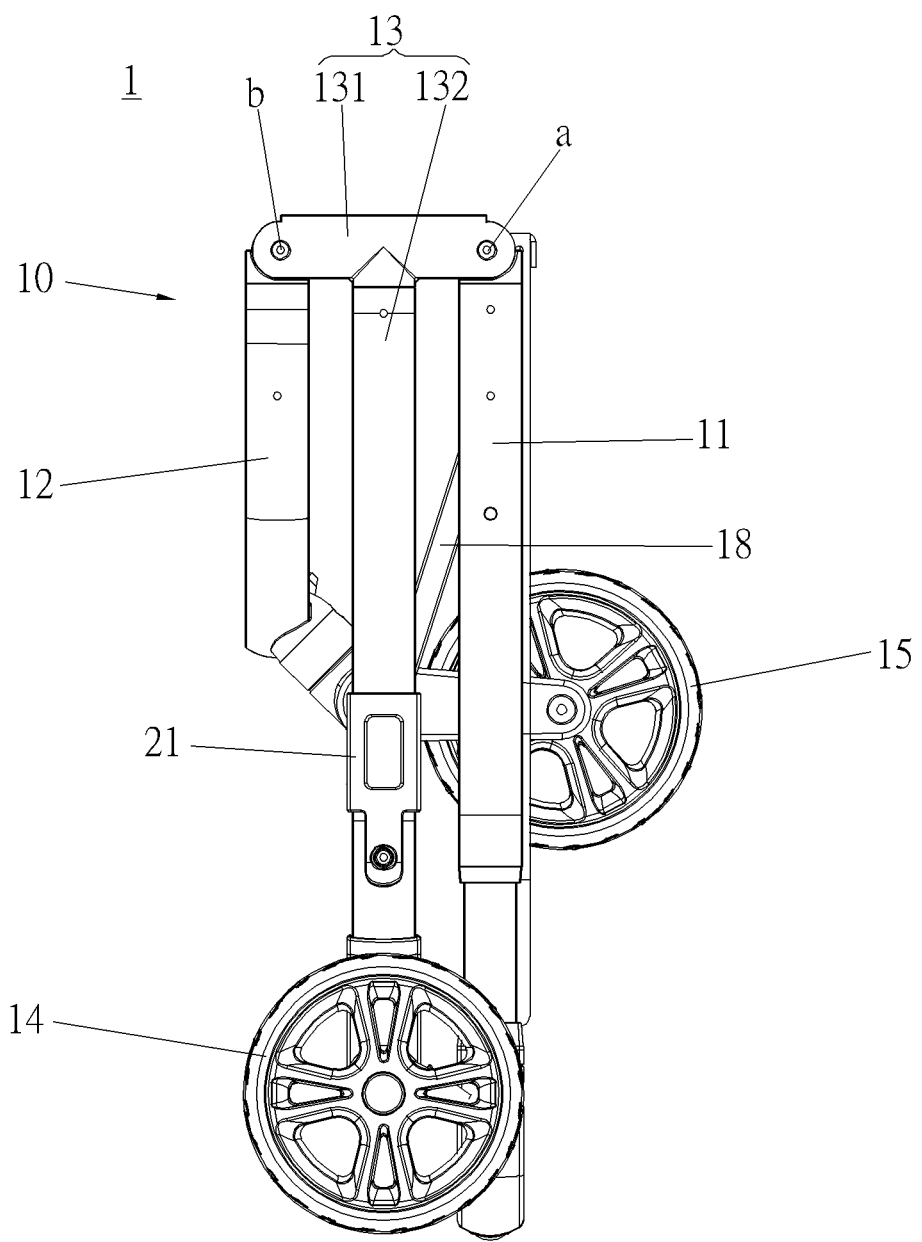
FIG. 12 is a schematic diagram illustrating the stroller which is folded.

The frame locking mechanism 20 includes a sliding sleeve 21. The sliding sleeve 21 is slidable along a lengthwise direction of the rear leg 13. The stroller frame 10 further includes a linkage bar 18 and a basket tube 19. An upper end of the linkage bar 18 and the handle 11 are pivotally connected at a third pivotal connection point c. A lower end of the linkage bar 18 and the sliding sleeve 21 are pivotally connected at a fourth pivotal connection point d. A front end of the basket tube 19 and the front leg 12 are pivotally connected at a fifth pivotal connection point e. A middle portion of the basket tube 19 and the sliding sleeve 21 are pivotally connected at the fourth pivotal connection point d. A rear end of the basket tube 19 protrudes backwards, which is convenient for users to put or take goods. The second pivotal connection point b and the fifth pivotal connection point e are axially symmetrical to the first pivotal connection point a and the third pivotal connection point c relative to the extension portion respectively. After the frame locking mechanism 20 unlocks the stroller frame 10, the sliding sleeve 21 can be slid along the rear leg 13 toward the rear wheel 14; at the meanwhile, the handle 11 and the front leg 12 are driven through the linkage bar 18 and the basket tube 19 to pivot toward the extension portion 132 to be folded. The folded stroller frame 10 can stand by being supported by the handle 11 and the rear wheels 14 (as shown by FIG. 12).

As shown by FIG. 4 to FIG. 8, a front end of the seat 30 is pivotally connected to the front leg 12. The rear end of the seat 30 is engaged with the rear leg 13 through a seat engaging mechanism 40. The frame locking mechanism 20 includes a linking part 226 connected to the seat 30. The linking part 226 extends out of the rear leg 13 and is fixedly connected to the seat 30. After the seat engaging mechanism 40 disengages the rear end of the seat 30 from the rear leg 13, the seat 30 can pivot relative to the front leg 12 so as to drive the linking part 226 to make the frame locking mechanism 20 unlock the stroller frame 10, which will be described in detail later. The seat engaging mechanism 40 will be described herein in advance. The seat engaging mechanism 40 is disposed on the seat 30. In the embodiment, the stroller 1 employs two seat engaging mechanism 40 which are disposed symmetrically for firmly engaging the two sides of the seat 30 with the two rear legs 13 respectively. Each seat engaging mechanism 40 includes an engaging pin 42, a second driving part 43, a manipulation part 44, a second elastic part 45, and a third elastic part 46. The rear leg 13 thereon has an engaging hole 133. The seat 30 thereon has a through hole 31. The engaging pin 42 passes through the through hole 31 and is movable in the through hole 31 so as to selectively engage with or disengage from the engaging hole 133. The second driving part 43 is fixedly connected to the engaging pin 42 and thereon has a first slanting surface 431. The manipulation part 44 thereon has a second slanting surface 441 which contacts the first slanting surface 431 and is slidable relative to the first slanting surface 431. A slanting direction of the first slanting surface 431 and the second slanting surface 441 form an angle relative to a movement direction of the engaging pin 42. One of the two second driving parts 43 is provided in a Z-shaped form; the other one is provided mirror symmetrically. The first slanting surface 431 is away from an end of the engaging pin 42. There is one manipulation part 44 employed. The manipulation part 44 has two second slanting surfaces 441 for matching with the two first slanting surfaces 431 of the two second driving parts 43 at two sides of the manipulation part 44 at the same time; therefore, the two seat engaging mechanisms 40 can be driven at the same time by manipulating the manipulation part 44. The second elastic part 45 is disposed between the second driving part 43 and the seat 30 for driving the engaging pin 42 to engage with the engaging hole 133. The third elastic part 46 is disposed between the manipulation part 44 and the seat 30 for driving the manipulation part 44 to return to its original position.

Figure 9:
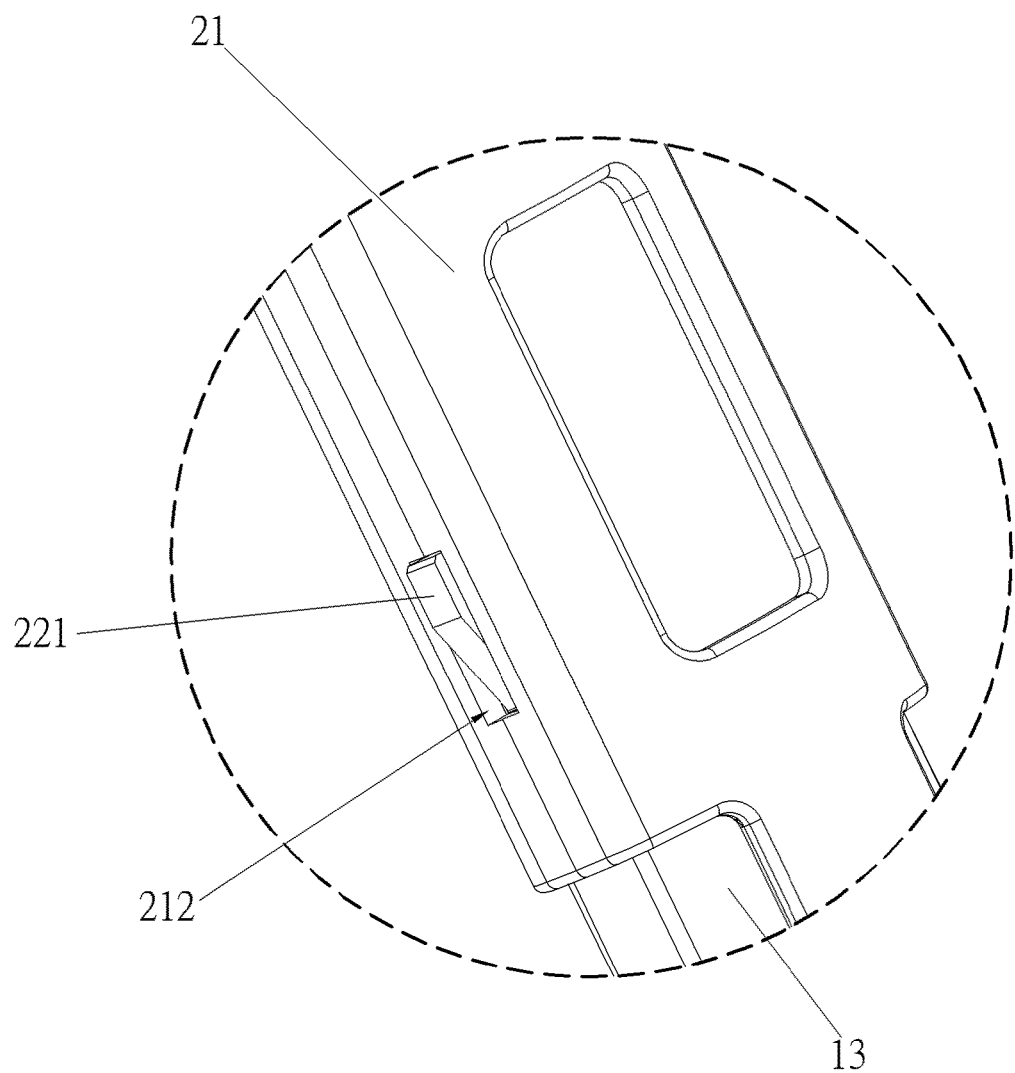
FIG. 9 is a schematic diagram illustrating a portion of the stroller for showing the exterior of a frame locking mechanism.
Figure 10:
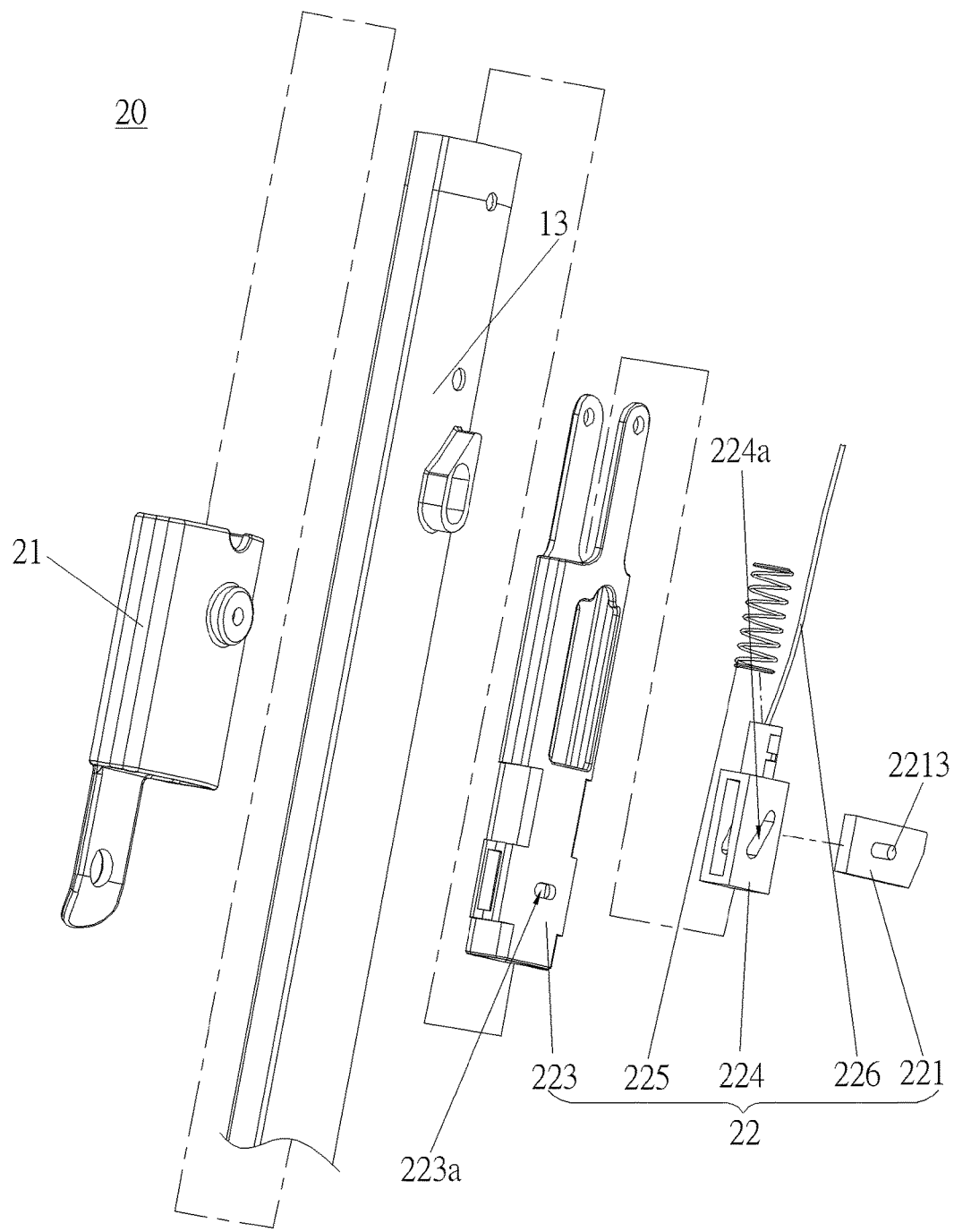
FIG. 10 is an exploded view of the frame locking mechanism.

As shown by FIG. 9 and FIG. 10, the frame locking mechanism 20 further includes an engaging assembly 22. The engaging assembly 22 fixes the sliding sleeve 21 to the rear leg 13. The sliding sleeve 21 is slidable along the lengthwise direction of the rear leg 13 and thereon has a positioning hole 212. The engaging assembly 22 is connected to the rear leg 13 and has a positioning pin 221. The positioning pin 221 is engaged into the positioning hole 212 so as to fix the sliding sleeve 21 to the rear leg 13. In practice, the engaging assembly 22 further includes a mount 223, a first driving part 224, a first elastic part 225, and a linking part 226. The rear leg 13 is tubular. The mount 223 is disposed inside the rear leg 13 and is fixedly connected to the rear leg 13. The mount 223 has a sliding slot 223a along an engagement direction of the positioning pin 221. The first driving part 224 thereon has a driving slanting slot 224a. An angle is formed by the driving slanting slot 224a and the sliding slot 223a. The positioning pin 221 thereon has a protrusion 2213. The protrusion 2213 passes through the sliding slot 223a and the driving slanting slot 224a simultaneously. The linking part 226 is connected to the first driving part 224. Rotating the seat 30 can pull the linking part 226 along the lengthwise direction of the rear leg 13. Under the constraint of the driving slanting slot 224a, the positioning pin 221 slides along the sliding slot 223a to an end of the sliding slot 223a away from the positioning hole 212, so that the positioning pin 221 departs from the positioning hole 212. The first elastic part 225 is disposed between the first driving part 224 and the mount 223. When the manipulating of the linking part 226 is stopped, the first elastic part 225 drives the first driving part 224 to return to its original position and keeps the positioning pin 221 in engaging with the positioning hole 212.

When the stroller 1 shown by FIG. 1 to FIG. 3 is required to be folded, the manipulation part 44 can be pulled to drive the seat engaging mechanism 40 to release the engagement of the seat 30 with the rear leg 13. Then, the seat 30 can be rotated around the second pivotal connection point b to pull the linking part 226, which is fixed to the seat 30, to move the driving part 224, so that the frame locking mechanism 20 unlocks the stroller frame 10. Afterwards, the sliding sleeve 21 can be slid along the rear leg 13 toward the rear wheel 14. The handle 11 and the front leg 12 pivot close to the rear leg 13. Therefore, the stroller frame 10 is folded, as shown by FIG. 11 and FIG. 12.

Compared with the prior art, the new foldable stroller 1 according to the invention includes the stroller frame 10, the frame locking mechanism 20, and the seat 30. By making the seat 30 pivot, the seat 30 drives the frame locking mechanism 20 to unlock the stroller frame 10 so as to fold the stroller frame 10. It is practicable to use one hand to manipulate the seat 30 for completing the folding of the stroller frame 10. Therefore, the structure of the stroller frame 10 is simple, and the folding can be performed conveniently, quickly, and smoothly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller, comprising:
   a stroller frame, the stroller frame being capable of being folded and unfolded, wherein the stroller frame comprises a handle, two front legs, and two rear legs corresponding to the two front legs, each rear leg comprises a transverse portion and an extension portion, an end of the transverse portion and a lower end of the handle are pivotally connected at a first pivotal connection point, another end of the transverse portion and an upper end of the corresponding front leg are pivotally connect at a second pivotal connection point, and a rear wheel is installed to a lower end of the extension portion;
   a frame locking mechanism, the frame locking mechanism locking the stroller frame to be unfolded; and
   a seat, the seat being pivotally connected to the stroller frame and being connected to the frame locking mechanism;
   wherein when the seat pivots, the seat drives the frame locking mechanism to unlock the stroller frame so as to fold the stroller frame.

2. The stroller of claim 1, wherein a transverse bar connects the two lower ends of the two rear legs, two connecting parts are disposed where the transverse bar is connected to the rear legs, and the two rear wheels are installed to the two connecting parts.

3. The stroller of claim 1, wherein the handle and the front leg pivot toward the extension portion to be folded, and the folded stroller frame is capable of standing by being supported by the handle and the rear wheels.

4. The stroller of claim 1, wherein the frame locking mechanism comprises a sliding sleeve, the sliding sleeve is slidable along a lengthwise direction of the rear leg, the stroller frame further comprises a linkage bar and a basket tube, an upper end of the linkage bar and the handle are pivotally connected at a third pivotal connection point, a lower end of the linkage bar and the sliding sleeve are pivotally connected at a fourth pivotal connection point, a front end of the basket tube and the front leg are pivotally connected at a fifth pivotal connection point, and a middle portion of the basket tube and the sliding sleeve are pivotally connected at the fourth pivotal connection point.

5. The stroller of claim 4, wherein the second pivotal connection point and the fifth pivotal connection point are axially symmetrical to the first pivotal connection point and the third pivotal connection point relative to the extension portion respectively.

6. The stroller of claim 1, wherein the frame locking mechanism comprises a sliding sleeve and an engaging assembly, the sliding sleeve is slidable along a lengthwise direction of the rear leg and has a positioning hole, the engaging assembly is connected to the rear leg and comprises a positioning pin, and the positioning pin is engaged into the positioning hole so as to fix the sliding sleeve to the rear leg.

7. The stroller of claim 6, wherein the engaging assembly further comprises a mount, a first driving part, a first elastic part, and a linking part, the rear leg is tubular, the mount is disposed inside the rear leg and is fixedly connected to the rear leg, the mount has a sliding slot along an engagement direction of the positioning pin, the first driving part has a driving slanting slot, an angle is formed by the driving slanting slot and the sliding slot, the positioning pin passes through the sliding slot and the driving slanting slot simultaneously, the linking part is connected to the first driving part, when the linking part is manipulated along the lengthwise direction of rear leg, the positioning pin is driven to depart from the positioning hole along the sliding slot, the first elastic part is disposed between the first driving part and the mount, and when the manipulating of the linking part is stopped, the first elastic part drives the first driving part to return and keeps the positioning pin in engaging with the positioning hole.

8. The stroller of claim 1, wherein a front end of the seat is pivotally connected to the front leg, a rear end of the seat is engaged with the rear leg through a seat engaging mechanism, the frame locking mechanism comprises a linking part connected to the seat, and after the seat engaging mechanism disengages the rear end of the seat from the rear leg, the seat is able to pivot relative to the front leg so as to drive the linking part to make the frame locking mechanism unlock the stroller frame.

9. The stroller of claim 8, wherein the seat engaging mechanism is disposed on the seat and comprises an engaging pin, a second driving part, a manipulation part, and a second elastic part, the rear leg has an engaging hole, the seat has a through hole, the engaging pin passes through the through hole and selectively engages with or disengages from the engaging hole, the second driving part is fixedly connected to the engaging pin and has a first slanting surface, the manipulation part has a second slanting surface, the second slanting surface contacts the first slanting surface and is slidable relative to the first slanting surface, a slanting direction of the first slanting surface and the second slanting surface and a movement direction of the engaging pin form an angle, and the second elastic part is disposed between the second driving part and the seat for driving the engaging pin to engage with the engaging hole.

10. The stroller of claim 1, wherein the handle comprises a handle upper portion and two handle lower portions pivotally connected to the rear legs, the handle upper portion is slidably connected to the two handle lower portions, and the handle upper portion slides relative to the two handle lower portions so as to adjust a height of the handle.

11. The stroller of claim 10, wherein the handle upper portion is fixed to the handle lower portion by a fixing mechanism disposed therebetween, the fixing mechanism comprises an unlocking manipulation part, and the unlocking manipulation part is disposed at a middle location of the handle upper portion.

* * * * *